Jan. 2, 1968 B. A. KAUFMAN 3,361,913

THIN FILM PARAMETRICAL DEVICE

Filed July 19, 1960 2 Sheets-Sheet 1

INVENTOR:
Bruce A. Kaufman
By Louis A. Kline
John J. Matlago
His Attorneys.

Jan. 2, 1968 B. A. KAUFMAN 3,361,913

THIN FILM PARAMETRICAL DEVICE

Filed July 19, 1960

2 Sheets-Sheet 2

INVENTOR:
Bruce A. Kaufman

By Louis A. Kline
John J. Matlago
His Attorneys

United States Patent Office 3,361,913
Patented Jan. 2, 1968

3,361,913

THIN FILM PARAMETRICAL DEVICE

Bruce A. Kaufman, Los Angeles, Calif., assignor to The National Cash Register Company, Dayton, Ohio, a corporation of Maryland Filed July 19, 1960, Ser. No. 43,801
27 Claims. (Cl. 307—88)

This invention relates to apparatus and methods useful in processing information in binary form, and more particularly the invention relates to parametrical apparatuses and devices useful in information-processing and other systems.

The techniques and procedures for processing information expressed as combinations of binary characters are now extensively known, as are apparatuses of many types and natures that are useful in accomplishing information-processing by manipulation of signals and records in binary form. Reference is here made to the voluminous text and periodical literature concerning the mentioned subjects for information concerning fundamental and advanced well known principles upon which the present invention is based.

This invention utilizes known principles of parametrical electric oscillations and their application to represent binary states or binary characters; and an illustrated dissertation upon those subjects in both elementary and more advanced form is contained in pages 1304 through 1316 of the August 1959 issue of "Proceedings of the IRE," to which publication reference is additionally made for information concerning principles, techniques, and constructions in the field or art in which the present invention is resident. Further, certain symbolic notation useful in explaining systems using parametrical units and/or devices, are set out in the mentioned publication and may herein be employed at least in part.

As is indicated in the cited publication (Proceedings of the IRE, August 1959), parametrical devices of both capacitive, and inductive (magnetic), types have been employed in prior art parametrical circuits. The inductive or magnetic type of parametrical devices therein illustrated are in the form of ferrite cores, of toroidal and other physical shapes. It is to parametrical devices and units of the magnetic type, and to apparatuses comprising those devices or units, that the present invention is more particularly directed. Due to the relatively large amount of magnetic material contained in even very small perforate magentic cores or toroids, the energy required for high frequency operation, and the heat evolved, are large in values. Additionally, perforate cores present severe winding problems, even when only single-turn coils are employed. Another objectionable feature associated with ferrite cores is that they are relatively fragile and hence require care in handling and mounting.

The present invention overcomes all of the aforementioned objectionable features and difficulties associated with parametrical devices using ferrite cores as inductive elements in the oscillatory circuits; and that is accomplished by using easily manufactured magnetic devices that utilize a very thin layer of anisotropic magnetic material on an electrical conductor which serves both as a physical support means for the magnetic material and as one conductive member of the inductively related parts of a parametrically operable unit. The thin layer of magnetic material is of such small bulk that heating effects and energy losses therein are minuscule relative to those in ferrite cores; and since the magnetic layer encircles a copper conductor and is, even in the least desirable construction, separated therefrom by only a very small distance, the small amount of heat generated in the magnetic material may easily transfer to the conductor and thereby be conducted away. Further, the curie temperature of the magnetic material is quite high (of the order of 600° C.) so that the device and units may be operated in a hot environment without serious adverse effects. Since the bulk of the magnetic material is small and the thickness of the layer is not great, the magnetic material may successfully be operated at very much higher oscillation frequencies than can ferrite cores. Further, since the magnetic-material portion of the inductive element of the oscillatory circuit may be merely an electroplated layer formed on the surface of a wire conductor, the magnetic device may in fact be easily and cheaply formed as a long cylinder of which only spaced-apart bands or zones are actually involved as magnetic elements of individual parametrical units. The windings or coils that are inductively related to the magnetic material, and which correspond to single or multiple-turn windings coursing through an aperture of a ferrite toroid, are in the case of the present invention merely simple easily-wound plural-turn solenoid coils encircling respective short spaced-apart portions of the magnetic film and its supporting conductor. In those instances or cases in which more than one winding must be inductively related to the same magnetic element or portion of a film, one or more additional plural-turns solenoid coils may be concentrically wound over previously wound coil or coils. A plurality of solenoid coils may thus be inductively coupled to the same magnetic element. As herein employed, the term "magnetic element" may be used to represent a short length of an electrolytically-deposited thin anisotropic magnetic film which may be spatially separated from another like element by an inactive portion of a single long cylindrical film or by a space in which no magnetic material is present. Preferably, but not necessarily, the base or conductor upon which the magnetic element or elements are mounted or formed is of a stiff, resilient character; hence the conductor may, in preferred constructions, be in the form of a Phosphor bronze, or beryllium-copper, wire. Preferably, but not necessarily, the magnetic material composed in the electroplated film is of low coercivity; hence that material may be of the nature of a nickel-iron alloy of the "permalloy" type. More detailed descriptions of the materials, modes, elements, units and apparatuses according to the invention will hereinafter be set out and explained.

From the preceding general description of the invention it becomes evident that a principal object of the invention is to provide an improved magnetic device for parametrical apparatus.

Another object of the invention is to provide improvements in parametrical apparatus.

Another object of the invention is to provide an improved parametrical unit.

An additional object of the invention is to provide a parametrical apparatus unit that is inexpensive, easily fabricated, and capable of operating at cyclical speeds in the multi-megacycle range.

The aforestated objects and other objects and advantages of the present invention are hereinafter made apparent by and in the appended claims and in the following description of a preferred embodiment of apparatus that is illustrated in the accompanying drawings, in which drawings:

Figures 1, 2, 3, 4:
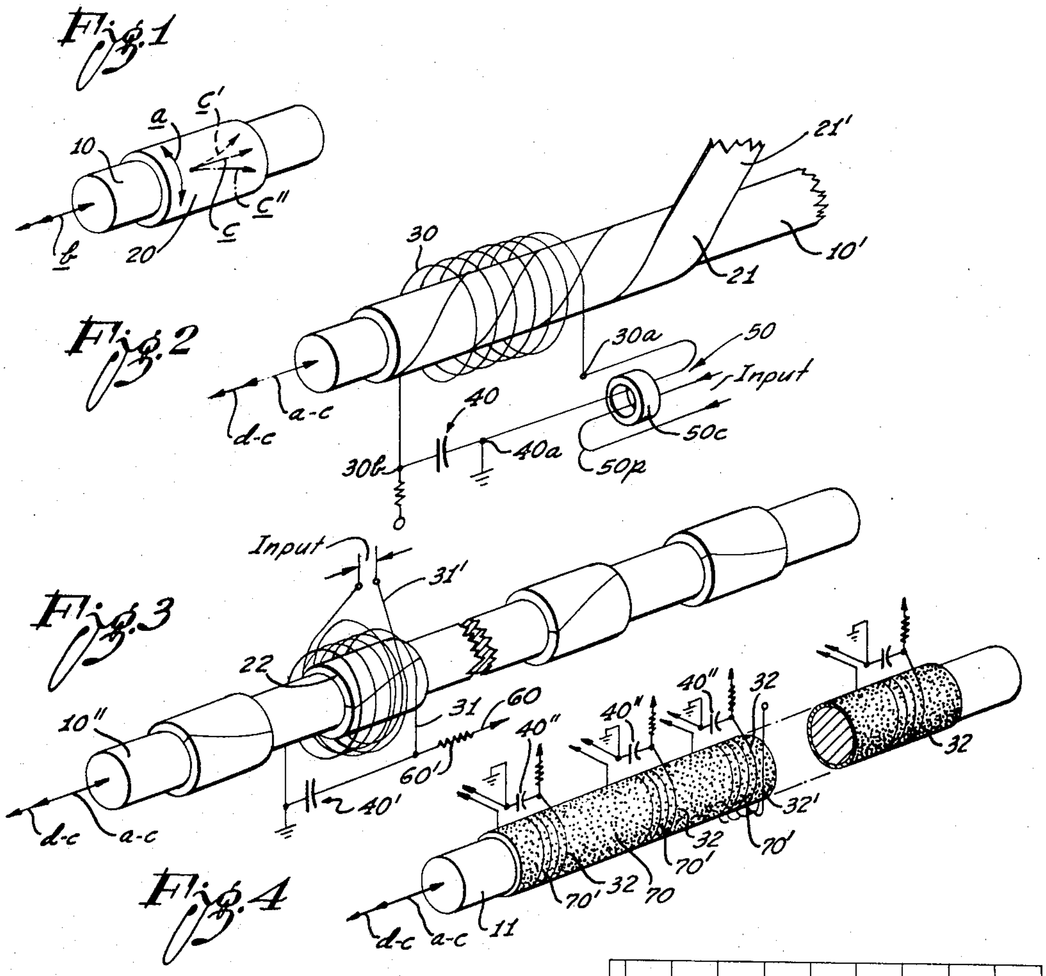
FIG. 1 is a diagram useful in explaining a physical concept and principle employed in the invention.
FIG. 2 is a grossly enlarged and partly diagrammatic view of structure and components comprised in one form of parametrical units.
FIG. 3 is a view, greatly enlarged and not necessarily of true proportions, illustrating in partly diagrammatic form a modified type of electromagnetic device forming a component of a parametrical unit.
FIG. 4 is a greatly enlarged partly diagrammatic view of a preferred form of electromagnetic inductive element as utilized in a multiple-unit parametrical apparatus according to the invention.

As indicated in the previously mentioned publication, operation of a parametrical unit involves the periodic injection of energy into an oscillatory system by substantially periodically varying one or more parameters of a periodic or oscillatory part of the unit. In the case of a parametrical unit comprising an oscillatory circuit having interconnected capacitance and inductance, either the capacitive-reactance parameter or the inductive-reactance parameter may be varied; and in the present invention the oscillatory means is an electrical oscillatory circuit of the type indicated and the inductive reactance is the parameter that is subjected to periodic variation. Further explanation will be made with reference to the latter type of parametrical unit although in part the explanation may be applicable to other types of units and apparatuses.

As is explained in the aforementioned publication and as is evident, energy may be injected into an oscillatory system during either of the first and second half-cycles of an oscillation of the system; and hence energy for injection may be conveniently derived from a source supplying energy periodically at a frequency equal to twice the natural frequency of the oscillatory system. Thus if the system is an electrical oscillatory system whose natural frequency is represented by $f$, injection of energy (change of the inductive-reactance parameter, for example) may conveniently be effected by utilization of an electromagnetic effect produced by an electric alternating current of frequency equal to $2f$. Also, as similarly explained in the mentioned prior art, oscillation of an oscillatory circuit or system whose natural frequency is represented by $f$ may be initiated by application of energy of frequency $f$ from a first source commencing with a particular half cycle (e.g., positive) or commencing with a half cycle of the opposite polarity. In either case the oscillations of the circuit or system will be at the subharmonic frequency $f$ (relative to the source), but in either case the phase of the oscillation will differ by $\pi$ radius with respect to that of the other. Once started in a particular one of the phase relationships (0 radians in the first case and $\pi$ radians in the second case), the oscillation of the circuit or system will remain stable in that phase relationship or state. It is these two different phase states of the system that are used to represent the respective binary characters (usually digits 1 and 0) employed in representing and processing information in binary form.

As also is set forth in the pertinent prior art, if proper initial conditions obtain in an oscillatory circuit, the phase of the oscillation may be controlled by a relatively weak application of energy of proper periodicity, and the amplitude of the oscillation increased at each cycle until the amplitude-limit of the system is reached. Thus powerful oscillations of proper phase may be initiated by application to the system of a very weak oscillation of the desired phase (0 or $\pi$), followed by continuing application of energy of frequency $2f$ from a powerful source. This is analogous to starting a swing oscillating by a gentle push or a gentle pull (depending upon which phase of oscillation is desired) and then strongly pushing and pulling the swing at the proper times during each oscillation and thus rapidly increasing the amplitude of the oscillation to the limit or to a desired level. In one sense, the effect may be termed amplification, or at least linked to amplification. Once the oscillations in an oscillatory circuit have attained the desired amplitude, they may be maintained by continued injection of energy (as by varying a circuit parameter, for example) at $2f$ frequency, or the oscillations may be purposefully damped or merely allowed to decay due to system losses and thus caused to disappear.

Figure 5:
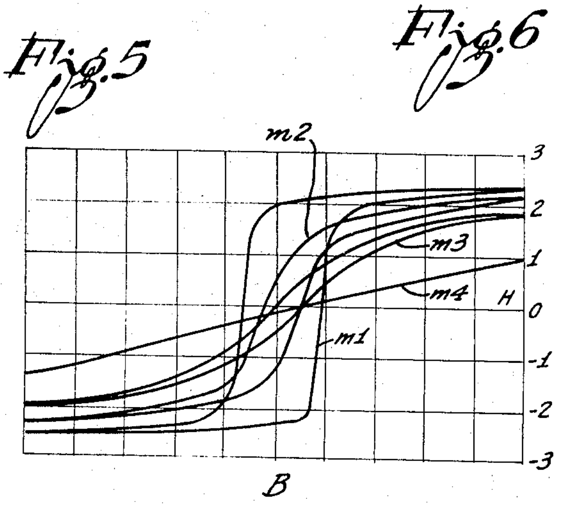
FIG. 5 is a graphical representation of electromagnetic characteristics of a magnetic device conforming to the invention.

In the units and apparatuses according to the invention, oscillation of the oscillatory (LC) circuit of a parametrical unit is initiated by generation of what may be a relatively weak alternating current in the circuit, by induction; and the oscillation is "amplified" by periodic variation of the inductive reactance ($L$) of the circuit by means of a current of frequency $2f$, which current by inductive effect varies the magnetic permeability of anisotropic magnetic material comprised in the inductor that provides the inductive reactance of the LC circuit. This variation of magnetic permeability may be illustrated by explanation with reference to FIG. 1, wherein element 10 is a section of an electric conductor and element 20 is a band of anisotropic magnetic material encircling the conductor. A current coursing through the conductor produces a circumferentially directed magnetic field around the conductor, the direction of the field depending upon the direction of the current. The circumferential disposition of the magnetic field is indicated by line $a$ in FIG. 1. The direction of the current may be indicated by line $b$ in the drawing. If the magnetic element 20 is very thin, of the order, for example, about 10,000 A. (angstrom units), and is anisotropic and is preferably so oriented as to have the property of being more easily magnetized in one direction than in others (that is, such as to have a so-called "easy" direction of magnetization), and if the material is of suitable magnetic permeability, element 20 may with a suitable winding form a time-variable inductance that may be varied by a current $b$ of alternating character, and the element may be used to form the variable inductive reactance of an oscillatory circuit. The magnetic structure provided by a very thin film magnetic element 20 may be inexpensively and easily produced in a highly anisotropic form, that is, with a high degree of anisotropy in a selected or particular direction; and such a film may in considering the permeability tensor be treated as a two-dimensional system in contrast to the three-dimensional system presented by, for example, an anisotropic torodial magnetic core device. The remanent magnetization of the oriented thin film form of element 20 may be represented by vector $c$ in FIG. 1, and variations thereof caused by the magnetic field produced by an alternating current coursing through conductor 10 may be represented by $c'$ and $c''$ as limits, the vector tending to displace in the direction of the applied field produced by the current coursing through the conductor. If a sensing coil arranged in encircling relationship to element 20 were provided, the changes of permeability of the element that would be inductively sensed by the coil would be evidenced by a change in the inductance of the coil. That change of inductance is the variable parameter that is utilized in the parametrical unit of the present invention. The variation in the effective permeability of element 20 provides a condition favorable for parametrical oscillation of a LC circuit comprising as the inductive reactance a conductor, preferably a coil closely encircling the element, inductively linked to the element. The variation of the permeability of element 20 that is exhibited as a variable current courses through conductor 10 may be illustrated, in a manner, by producing a family of magnetic hysteresis loops with alternating current coursing through the conductor and with each curve or loop produced at a different value of "direct current bias" produced by an additional, direct, current coursing through the conductor. Such a family of curves is depicted in FIG. 5, wherein curve or loop *m1* represents the hysteresis characteristic with a zero value of direct current bias field, *m2* represents the characteristic with some D.C. biasing current applied, *m3* represents the characteristic with a substantial degree of magnetic saturation by D.C. bias, and *m4* the condition with an extreme bias. The change in inductive reactance exhibited by a coil linked to element 20 may be represented by the change in the slope of the hysteresis loop (either limb) measured at the O-axis. In operating the element 20 in a parametrical unit, an intermediate value of continuous biasing field is supplied by an intermediate value of direct current coursed through conductor 10, the current value being such that the hysteresis loop is, for example, that represented at *m2*, or *m3*, or a characteristic intermediate *m2* and *m3*; and then an additional current (A.C.) is forced through conductor 10, so that the magnetization or hysteresis characteristic is shifted from that at *m1* to that at *m4* and return. Thus the magnetic permeability of element 20, and its reflected inductive effect as sensed by an encircling coil, are similarly varied. Several different forms of anisotropic magnetic element 20 have been utilized, as will presently be made evident in this disclosure.

Referring now to FIG. 2, an insulated electric conductor 10′, preferably of stiff resilient beryllium-copper alloy and preferably insulated by means of a very thin layer of enamel or the like, has applied thereto a spirally-wrapped layer 21 of anisotropic magnetic material which preferably, but not necessarily, is initially in the form of a thin flat tape 21′ of molybdenum permalloy. The latter may be, for example, a grain-oriented molybdenum Permalloy tape of one-eighth mil thickness and one-sixteenth inch width, designated "Hi-mu 80" and commercially available from Magnetic Incorporated, Butler, Pa. Conductor 10′ may in this example be 16-gauge wire, suitably insulated. The tape is tightly wrapped upon the wire as indicated, and forms a magnetic layer over which one or more coils, such as coil 30, may be closely wrapped. Coil 30 may be of insulated copper wire and may be of a number of turns determined by circuit parameters and operating frequency in accord with known principles of electronic design. The coil is in practice wound around the covered conductor but is shown in expanded form to facilitate illustration. It is evident that the magnetic material or layer 21 is oriented in a direction defined by a spiral about the axis of conductor 10′. That portion of the layer that is inductively linked to coil 30 serves as a variable element by means of which the effective inductive reactance of coil 30 may be varied. Other similar coils (not shown) may be close-wound over and around other respective spaced-apart portions of the spirally-wrapped magnetic tape, as is thought to be evident. Coil 30 is incorporated as a variable-reactance element in an oscillatory circuit by connection to a capacitor 40 as indicated in FIG. 2. The LC circuit thus formed may be locked into a desired phase of oscillation by having induced therein a reference signal of frequency *f* by a transformer means 50 which has for its secondary a one-turn portion of the conductor connecting one terminal **30*a* of coil 30 to a terminal 40*a* of capacitor 40, and which transformer has as a ferromagnetic core 50*c* a ferrite ring. The input lines to the parametrical unit thus constructed may thus comprise primaries such as 50*p* of transformer 50, each primary in this case being a single turn of conductor linked to core 50*c*** as indicated. The LC circuit is constructed and tuned to have a natural frequency *f* and is, in operation, excited into oscillation by a current of frequency *f* passed through the input line and **50*p***, and the excitation (which is of proper phase) is immediately followed by application of A.C. of frequency 2*f* to conductor 10′. Thereafter the unit oscillates at frequency *f* until injection of power by the alternating current is terminated, and the oscillation then quickly decays due to circuit and magnetic losses, as will be understood by those skilled in the electronics art.

An alternative form of parametrical units is illustrated in FIG. 3, wherein a series of spaced-apart peripheral magnetic bands, such as magnetic element 22, are applied to an insulated conductor such as 10″ as shown. The bands, which may be formed of one or more wraps of grain-oriented magnetic tape of the type used in the previously described structure, are adapted to have wound thereover one or more coils and to thus provide means for effectively changing the inductive reactance of an oscillatory circuit including such a coil. As illustrated, magnetic element 22 is provided with a first coil 31 that is connected as the principal inductive element of an oscillatory circuit that comprises a capacitor 40′, as indicated. A second coil, 31′, wound over coil 31, serves as an exciter or input for the unit when supplied with current of frequency *f*. The oscillatory circuit, comprising coil 31 and capacitor 40′, is tuned by means of the capacitor to a frequency *f*, and the input current is supplied to the input terminals at a frequency *f*. Following excitation, power is injected into the unit by A.C. of frequency 2*f* forced through conductor 10″. As in the previously explained embodiment, a continuous-current (D.C) is forced through conductor 10″ to produce the bias-effect; and the respective A.C. and D.C. currents are represented by lines *a–c* and *d–c* in each of FIGS. 2 and 3. An output line 60 is connected to the "high" or ungrounded side or limb of the oscillatory circuit, and may include an output resistor 60′, all in a manner and by means made evident in FIG. 3. It is evident that many of magnetic elements such as element 22 may be disposed along a relatively long length of conductor 10″ and each be provided with a respective set of coils similar to coils 31 and 31′ forming parts of respective independent parametrical units. Such other sets of coils and the respective associated capacitors, resistors, and connectors are omitted from the drawing for the sake of clarity of illustration.

A preferred form of multiple-unit parametrical apparatus, comprising a preferred form of anisotropic magnetic element or elements, is illustrated in part in FIG. 4. Therein a stiff resilient electric conductor 11, preferably of beryllium-copper alloy or Phosphor bronze, and devoid of insulation, supports thereon a preferably but not necessarily continuous thin cylindrical film 70 of electrodeposited anisotropic magnetic alloy which constitutes one or more magnetic elements forming parts of respective different parametrical units. Each parametrical unit comprises a respective coil 32 closely wound around a respective portion of magnetic film 70, a respective capacitor means 40″, a respective exciter coil 32′ (shown only in part on only one unit but of the character of coil 31′ of FIG. 3), and an encircled portion of conductor 11. Construction, excitation and operation of each of the units is similar to that of the types of units previously described, with the exception that the magnetic elements, 70′, of the preferred embodiment are of different construction and of somewhat different composition, and the conductor over which the magnetic thin film is electrodeposited is not insulated. The conductor 11, upon which the magnetic material is electrodeposited, is formed as a stiff resilient base to avoid undue mechanical strain in the magnetic film, the latter being to some extent strain-sensitive.

Continuing with reference to the preferred form of anisotropic magnetic element and device depicted in FIG. 4, the magnetic film or layer comprised in element 70 is preferably of a Permalloy-type composition, that is, of nickel and iron, electrodeposited upon a bare wire. The following tabulation of pertinent data pertains to an exemplary device, the thickness of the magnetic layer thus produced having been found to give satisfactory results:

TABULATION

A. Wire:

Stiff resilient beryllium-copper alloy, 50 mils diameter

B. Electroplating bath composition:

| | | |
|---|---|---|
| $NiSO_4 \cdot 6H_2O$ | g./l. of solution | 262 |
| $FeSO_4 \cdot 7H_2O$ | do | 15 |
| $MgSO_4 \cdot 7H_2O$ | do | 125 |
| $H_3BO_3$ | do | 30 |
| Saccharin (soluble) | do | 1 |

C. Electroplating:

| | | |
|---|---|---|
| pH | | 2.7 |
| Temperature | | Room |
| Current density | amps/ft.$^2$ | 2.9 |
| Plating time | minutes | 12 |
| Axial field | oersteds | 100 |

D. Operating characteristics of plated wire:

| | | |
|---|---|---|
| Hc (coercivity) | oersteds | 2 |
| Biasing current (D.C.) | amperes | 1 |
| Pump current (A.C.) | ma. (RMS) | 500 |
| Pump current frequency | megacycles/sec. | 20 |
| Output voltage | v. (peak to peak) | 10 |

The axially-directed magnetic field used to produce anisotropy in the thin magnetic electroplate or layer on a relatively short wire or conductor as the plating operation is performed, is produced by forcing a current of .3 ampere through a No. 26 gauge copper-wire helix of approximately 5.5 inches length and of approximately 4,000 turns of 1.4 inches diameter, the helix or coil encircling a tubular glass plating cell. The beryllium-copper alloy wire to be plated forms the cathode, and the anode is provided as a helix of platinum wire.

As indicated in FIG. 4, the magnetic element or layer 70 is most conveniently formed as a continuous film; however, by known and obvious masking or etching expedients, the plating may be restricted to those spaced-apart areas of the wire about which the coils of respective parametrical units are to be wound. When the magnetic layer is produced as a continuous film, the encircling coils are wound on the device at locations spaced apart far enough that mutual inductive effects between next-adjacent units is negligible. In an exemplary construction with a core wire of 50 mils diameter and oscillatory-circuit coils of 15 close-wound turns of No. 30 enameled copper wire, center-to-center spacing of coils of twice the coil length provides acceptable isolation. The number of turns and wire size are not critical and may be varied in accordance with known principles of electrical design. As is evident upon examination of FIG. 4, the coils of a very large number of parametrical units may be disposed upon a single length of conductor 11 and film 70. Thus conductor 11 and its electroplated thin cylindrical nickel-iron alloy film, being easily and inexpensively produced, constitute a marked improvement over prior magnetic elements such as ferrite toroids which are relatively bulky and expensive and which consume much power in operation. Further, due to the thinness of the magnetic film or layer 70, operating speeds are attained that are greatly in excess of those speeds attainable with units using ferrite cores as the variable-permeability elements. Each of the parametrical devices constituted by respective portions of conductor 11 and magnetic element 70, and the associated circuit elements including coils 32 and 32′ and capacitor 40″, is an independent device. Typical apparatuses employing groups and/or sets of such parametrical devices will be presently explained in connection with FIGS. 7, 8 and 9. While in FIGS. 1, 2, 3 and 4 the conductors including conductors 10 and 11, and the magnetic elements including strip 21′ and bands 22 and film 70, have all been illustrated in grossly enlarged size and in distorted form to facilitate illustration, it should be noted that those structures are very small in diameter. For example, the conductors 10′ and 11 as in the illustrative example are of but five hundredths inch diameter; and the close-wound coils are of very small (about No. 30 gauge) wire, thus permitting, with the employment of very small capacitors 40″, construction of very small yet quite inexpensive parametrical units.

Figure 6:
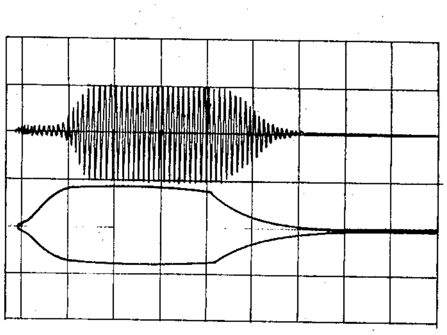
FIG. 6 is a set of graphical representations comprising a wave form and a wave-form envelope, developed from photographs of oscillograph traces and useful in explaining certain characteristics of circuit means comprised in apparatus according to the invention.
Figure 7:
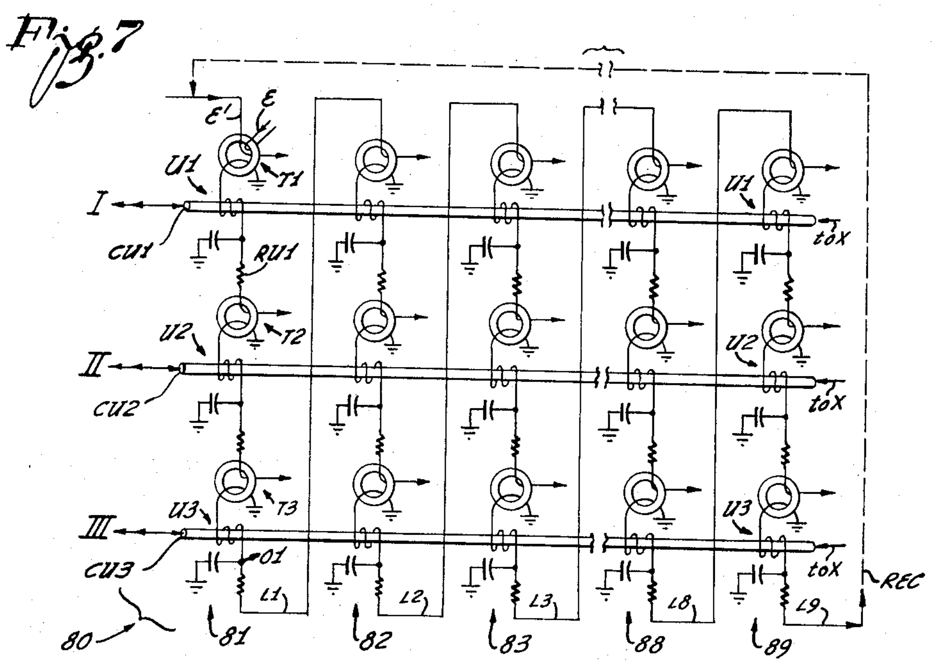
FIG. 7 is a diagrammatic representation of a parametrical apparatus according to the invention.
Figure 8:
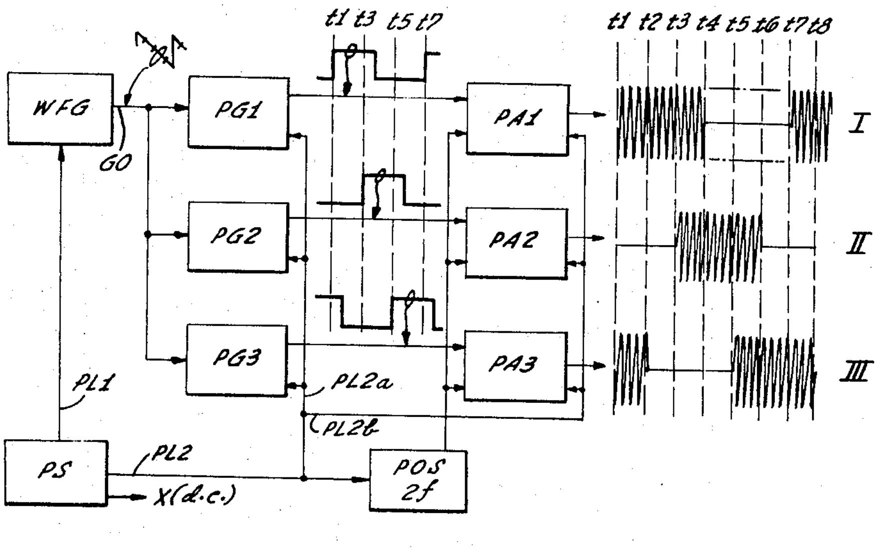
FIG. 8 is a block diagram with accompanying electrowave diagrams useful in explaining the invention.

With reference now to FIG. 7 and to the aforementioned publication in which explanation of the use of parametrical devices or units in sets of three is made, and with reference also to FIGS. 6 and 8, a typical illustrative or exemplary parametrical apparatus according to the invention will be explained. The apparatus, indicated generally by ordinal 80 in FIG. 7, may be employed as a counter or as a shift register. That apparatus comprises sets 81, 82, 83–88 and 89 of parametrical units, it being understood that there may be any desired number of sets of units disposed in the illustrated break between unit 83 and unit 88. Each set includes first, second and third parametrical units represented generally by respective ordinals U1, U2 and U3. Since in any given set the unit U1 must be supplied power of frequency $2f$ prior to the time power of exactly the same frequency and phase is supplied to unit U2, and similarly unit U2 must be supplied power before termination of the supply of power to unit U1 and prior to supply of power to U3, each of the units U1, U2, and U3 of any given set utilizes a separate respective power-injection or "pump" conductor. Those conductors are designated CU1, CU2, and CU3, as indicated in FIG. 7. Each conductor has a thin cylindrical film of anisotropic low-coercivity magnetic composition thereon, as in the previously described embodiment of device depicted in FIG. 4. Since, as explained in the mentioned publication, binary information is progressed from set to set of the parametrical units (from left to right) in the figure, all of units U1 of the several sets may utilize the same conductor, CU1, as shown; and similarly in the case of units U2 and conductor CU2, and units U3 and conductor CU3. As is known, a binary digit (0 or 1) is "inserted" or entered into the apparatus by, for example, applying an initial electrical excitation of proper phase (0 or $\pi$ electrical radians) and of $f$ frequency to the unit U1 by way of an exciting winding E inductively linked to the unit by way of the input means which in this example is the ferrite-ring transformer T1; the excitation being immediately followed by application of the injection current of $2f$ frequency in conductor CU1. A digit, once entered into unit U1, is there represented by the oscillation of that unit, the value, 0 or 1, being represented by the phase, 0 or $\pi$, and will remain in storage in the unit as long as power of frequency $2f$ is injected into the oscillatory circuit of the unit by way of the alternating current in conductor CU1. As in the previously described units the conductors CU1, etc., are also supplied with biasing direct current.

Continuing with reference to FIG. 7, the oscillatory circuit of unit U1 has an output line connected, by way of an output or coupling resistor RU1, to the primary of the input transformer T2 of unit U2 of set 81, as shown. The output line of the unit, as is true of the output lines of the other units, is terminated at a ground although shown terminated by an arrow point to indicate possible extension through other means. Thus as a digit is stored in unit U1, excitation of the phase (0 or $\pi$) representing the digit is being furnished to unit U2; and as soon as current of frequency $2f$ is supplied or "gated" to conductor CU2, that digit will have been entered into unit U2. As will be explained in connection with FIG. 8, pulses of alternating current of frequency $2f$ are supplied to conductors CU1, CU2 and CU3 in properly timed relationship. After a digit has been entered or transferred into unit U2 from unit U1 as described, the supply of A.C. power to conductor CU1 is terminated, and thus the digit stored in U1 is discarded or becomes extinct. Thereafter, the digit thus temporarily stored in U2 is transferred to unit U3 by way of transformer T3 and supply of power of frequency $2f$ to conductor CU3. Prior to transfer of the digit to unit U3, unit U1 has become inactive due to termination of supply of A.C. power to conductor CU1; and thus it is evident that a digit is thus prevented from progressing backwardly (that is, in the direction from U3 to U2 to U1). By connecting the output line of unit U3 of set 81 to the input transformer primary of unit U1 of set 82 by way of an interconnecting means comprising a lead L1, and by again supplying a pulse of A.C. power to conductor CU1 after termination of supply of A.C. power to CU2, the digit resident in unit U3 is transferred to unit U1 of set 82. The digit may then be shifted or transferred, in a manner now evident, through the units of set 82, and on to set 83, etc., by way of interconnecting leads L2, L3, etc., until it arrives at the unit U3 of the last set of units of the apparatus. Concurrently with transfer of a digit from U3 of set 81 to U1 of set 82, a new digit may be entered into unit U1 of set 81, since the latter unit is by that time idle or "empty." Thus as a digit is shifted from set (stage) to set (stage) of the apparatus, other digits may be entered, until the apparatus is "filled" or contains as many digits in serial order as there are sets of parametrical units. In this example, the apparatus forms a shift register, and each set of parametrical units constitutes a stage of the register. The register may be formed into a recirculating register by connecting the output line of unit U3 of the last stage (set 89) to an additional input or exciting winding E' wound on transformer T1 of unit U1 of set 81, by way of lead L9 and an interconnecting lead REC represented by a broken line in FIG. 7.

In the apparatus depicted in FIG. 7 the direct biasing currents and the respective timed pulses of A.C. power supplied to conductors CU1, CU2, and CU3 are represented by respective arrow pointed lines at the left-hand ends of those conductors; and the A.C. pulses, being in sets of three, are designated I, II and III as indicated. With reference to FIG. 8, an exemplary apparatus for supplying the D.C. biasing currents and the timed pulses of energy-injecting alternating current of frequency $2f$ will be described, it being noted that any suitable power supply means may be used and that the components of the illustrated power supply system are conventional and are not, per se, of the present invention. In FIG. 8, which is in block-diagram form with accompanying pertinent wave-form representations useful in illustrating gating and timing of pulses, PS represents a source of electrical power which is capable of providing direct current and alternating currents of suitable voltages. Power is supplied from PS to a wave-form generator WFG by way of a lead PL1, and to a power oscillator POS by way of a lead PL2. Also power is supplied to each of a set of three fast-rise-pulse generators PG1, PG2, PG3, and to each of a set of three power amplifiers PA1, PA2 and PA3, by way of respective branch leads PL2*a* and PL2*b*, as indicated. Wave-form generator WFG may be a commercially available component designated No. 162 by the manufacturer, Tektronix, Inc., Portland, Oreg.; and pulse generators PG1 etc., may be commercially available components designated No. 163 by the same manufacturer. Components POS and the amplifiers may be of any suitable conventional construction. Generator WFG produces at a desired repetition rate a "saw tooth" electric wave such as is diagrammatically depicted adjacent the generator output lead G0. Each of pulse generators PG1, PG2 and PG3 is set to "fire" or produce an output pulse when the input potential thereto attains a respective prescribed level. The three generators are so set as to provide pulses whose "leading edges" are uniformly time-spaced in repetitive series, as indicated in the wave forms adjacent their respective output leads; and the durations are such that a pulse from PG1 overlaps the initial portion of a pulse from PG2, etc., as indicated. Thus if each repetition period or cycle of generator WFG is divided into six equal time periods $t1$–$t2$, $t2$–$t3$, $t3$–$t4$, etc., the pulse from PG1 should occupy all of periods $t1$–$t2$ and $t2$–$t3$ and overlap into the succeeding period, and similarly, the pulse from PG2 should occupy all of periods $t3$–$t4$ and $t4$–$t5$ and overlap into period $t5$–$t6$, etc., as indicated. The rectangular-wave pulses produced by the pulse generators are time-spaced (distributed in time) in the proper relationship for gating alternating current to the three power-injection conductor means of parametrical apparatuses, such as conductors CU1, CU2 and CU3 in FIG. 7. The pulse outputs of the pulse generators are accordingly applied to gate respective power amplifiers PA1, PA2, and PA3 as indicated, whereby each of the latter produces on a respective output line a respective continuing series of pulses or bursts of alternating current of frequency $2f$ (the amplifiers being each supplied with an electric wave of frequency $2f$ from power oscillator POS as indicated). The respective series of A.C. pulses or bursts are denoted I, II, and III, and are supplied, for example, to conductors CU1, CU2 and CU3 of the apparatus depicted in FIG. 7, as indicated at the left end of that figure. As indicated by the respective wave diagrams and the time-period divisions, the A.C. power pulses of series I, II and III are of proper frequency and time-relationship to effect the aforedescribed operations of the apparatus, in FIG. 7.

Figure 9:
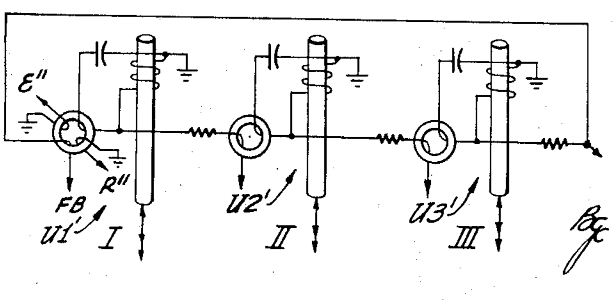
FIG. 9 is a circuit diagram illustrating a bistable parametrical apparatus according to the invention.

In FIG. 9 there is illustrated another form of parametrical apparatus, comprising a parametrical flip-flop composed essentially of three interconnected parametrical units U1', U2' and U3', connected to recirculate an entered binary digit. The digit is entered into unit U1' by way of an input line E'' in a manner now evident, and continues in the flip-flop until a "reset" excitation of required phase is supplied on another input lead, as is fully explained in the cited publication. It is evident that the digit is transferred from unit U3' to unit U1' by means of the feedback lead FB. The status of the flip-flop may be sensed by connection to the terminal end of the feedback lead. The flip-flop is "set" by entry thereinto of a digit "1," for example, and is "reset" by entry thereinto of a digit "0," the former representing the "true" state of the flip-flop and the latter representing the "false" state. In the flip-flop, each of the three parametrical units comprises a respective conductor bearing a thin film of anisotropic magnetic material of the character previously described and explained, each of which conductors is supplied with a respective one of the three series (I, II, and III) of A.C. pulses, as diagrammatically indicated in FIG. 9. The respective oscillatory circuits of the three units are, like those of units previously described, tuned to the sub-harmonic frequency $f$, the A.C. power-injection currents in the conductors being of frequency $2f$.

In each of the described parametrical units the triggering or exciting potentials or currents of frequency $f$ is applied to the oscillatory circuit prior to application of the power-injecting current, and is continued during at least the initial portion of the period of application of the latter current, whereby as the amplitude of the oscillation increases the proper phase relationship relative to a standard (0 or $\pi$) is established with certainty. The manner in which an oscillation in a parametrical unit oscillatory circuit increases in amplitude following application of A.C. to the power-supplying conductor is illustrated in FIG. 6, wherein the upper wave form represents the subharmonic oscillation of frequency $f$ (10 megacycles/sec. in the present example) set up in the oscillatory circuit, and wherein the lower graph is the envelope of the wave of frequency $2f$ (20 megacycles/sec. in the example) forming the A.C. power-injecting pulse. The gating of the latter current is repetitive at a frequency of approximately 100 kc./sec.

From the preceding description of a preferred form of parametrical unit comprising as an element for varying a parameter of an oscillatory circuit a device comprising a conductor provided with a very thin cylindrical film of anisotropic magnetic material of low coercivity, and from the description of typical parametrical apparatuses comprising parametrical units of the preferred type, it is made evident that the present invention provides the aforementioned advantages and improvements in parametrical units and apparatuses and fully anticipates the stated objects of the invention. While the disclosed preferred embodiment of magnetic parametrical device and unit thus amply illustrate the invention, it is not desired that the invention be limited other than to the scope of the appended claims.

What is claimed is:

1. A multiple unit parametrically operable apparatus comprising, in combination: first means, including a plurality of oscillatory electrical circuits each comprising a capacitive means and an inductor coil, each of the oscillatory electrical circuits of said first means being tunable to oscillate at a selected frequency; second means, comprising an electro-magnetic device comprising a single electrical conductor and an anisotropic thin-film, said thin-film comprising a circumferentially-continuous cylindrical electroplate of magnetic material of low coercivity adherent upon the conductor, said electromagnetic device and cylindrical electroplate extending through the inductor coil of each of said plurality of oscillatory electrical circuits and being disposed for mutual inductive relation therewith; and third means, including means for supplying to said electrical conductor alternating current of frequency twice said selected frequency, whereby the inductive reactance of said oscillatory circuits is varied by action of the magnetic field of the alternating current and oscillation is maintained in the oscillatory circuits.

2. Apparatus as defined by claim 1, including input circuit means for inductively coupling phased signals of said selected frequency to said oscillatory circuits for predetermining the phase of oscillation of said oscillatory circuits.

3. Parametrically operable apparatus comprising, in combination: first means, comprising a plurality of electrical oscillatory circuits each comprising a capacitive means and an inductor coil connected and constructed and arranged for tuning to a determined frequency; second means, including input means and interconnecting means, constructed and arranged to intercouple said oscillatory circuits in serial order for control of oscillation of one of the circuits by a preceding one of the circuits in the series; third means, including a plurality of electrical conductors each bearing a respective anisotropic thin-film, said thin-film comprising a circumferentially-continuous cylindrical electroplate of magnetic nickel-iron alloy and each disposed through a respective one of the inductor coils of said oscillatory circuits in inductive relation thereto; and fourth means, including means for supplying respective series of pulses of alternating current of a frequency twice said determined frequency to said electrical conductors, for initiating and maintaining oscillations in said oscillatory circuits.

4. A parametrically operable apparatus comprising: first means, including a group of sets of oscillatory electric circuits each set of which comprises first, second and third ones of the oscillatory circuits and each of which oscillatory circuits includes capacitive means and an inductor coil interconnected and arranged for tuning to a prescribed frequency; second means, including coupling and interconnecting means, arranged to couple first, second and third oscillatory circuits of any set thereof in series order and arranged to couple the several sets thereof in serial order; third means, including first, second and third electrical conductors each bearing a respective anisotropic thin-film, said thin-film comprising a circumferentially-continuous cylindrical electroplate of magnetic nickel-iron alloy and each extending through a respective one of the inductor coils of said first, second and third ones of the oscillatory circuits of said sets in inductive relationship therewith for variation of the inductive reactances of the oscillatory circuits; and fourth means, including means for supplying to said electrical conductors respective series of time-spaced pulses of alternating current of frequency twice said prescribed frequency, whereby incident to supply of such current the variations of the permeability of said magnetic nickel-iron alloy varies the inductive reactances of the oscillatory circuits and whereby time-spaced oscillations are created in said oscillatory circuits in serial order.

5. Parametrically operable apparatus comprising in combination: a continuous length of electrical conductor having the properties of being stiff and resilient to thereby resist transient deformation and prevent permanent deformation; an anisotropic thin-film of magnetic material deposited directly on said conductor and firmly adherent thereto to provide multiple parametrical unit locations along the length of said conductor wherein the stiffness and resiliency of said conductor prevent mechanical strains from being produced in said magnetic thin-film to maintain uniform magnetic properties of the thin-film along the entire length of said conductor, said anisotropic thin-film having a preferred direction of remanent magnetization along an easy axis and a non-preferred direction of magnetization along a hard axis which is substantially perpendicular to said easy axis, said thin-film being continuous and uniformly deposited to provide an anisotropic thin-film of uniform thickness and uniform magnetic properties to provide uniform magnetic operating characteristics for multiple thin-film parametrical units disposed at said locations; circuit means for applying an A.C. exciting current of a predetermined high frequency and a D.C. bias current to said electrical conductor to produce an alternating magnetic field superimposed on a bias magnetic field having a maximum magnetic field intensity along the entire length of the conductor surface and in said magnetic thin-film deposited directly on said conductor surface, said anisotropic thin-film being responsive to said magnetic fields to cause oscillatory motion of the direction of magnetization by rotation of the magnetization vector to produce periodic, uniform variations in the permeability of said thin-film along the entire length of said conductor; and multiple tuned circuits having inputs and outputs, and inductive elements which are inductively coupled to spaced-apart portions of said anisotropic thin-film at said multiple parametrical unit locations to provide said multiple thin-film parametrical units on said continuous length of electrical conductor, said tuned circuits being responsive to said periodic variations in permeability of said thin-film and said alternating magnetic field superimposed on said bias magnetic field to produce uniform, periodic variations of the inductive reactance of each of said tuned circuits to provide subharmonic parametrical oscillations of uniform signal amplitude at said outputs whereby said multiple thin-film parametrical units can be interconnected to form an operative logical network requiring uniform signal amplitudes for performing logical operations.

6. Parametrically operable apparatus according to claim 5 in which said anisotropic thin-film of magnetic material comprises a nickel-iron electroplate of the permalloy type which is firmly adherent to said conductor and the preferred direction of remanent magnetization is axial.

7. Parametrically operable apparatus according to claim 5 in which the anisotropic thin-film is a continuous cylindrical thin-film providing a circumferentially-continuous magnetic path whereby the periodic variations in permeability of the thin-film are uniformly and easily produced.

8. Parametrically operable apparatus according to claim 7 in which the inductive elements comprise coils supported and wound directly on said thin-film on said conductor.

9. Parametrically operable apparatus according to claim 8 in which the inputs to said multiple tuned circuits comprise additional solenoidal coils encircling and supported at respective parametrical unit locations to provide inductive coupling of input signals to respective ones of said multiple tuned circuits.

10. Magnetic parametrical apparatus comprising: a single variable-permeability magnetic means for a plurality of multi-megacycle parametrically operable units, said magnetic means comprising a continuous length of bare electrical conductor formed from stiff, resilient electrically conductive material, and an anisotropic nickel-iron thin-film of low coercivity having a minimum of strain sensitivity and uniformly electrodeposited on the stiff, resilient base formed by said continuous length of conductor to prevent mechanical strain in said anisotropic thin-film and thereby provide uniform magnetic properties among said plurality of parametrically operable units; a plurality of parametrically oscillatory circuits having interconnected inductive and capacitive elements, said inductive elements comprising a plurality of solenoidal windings supported by and wound directly on spaced-apart portions of said thin-film electrodeposited on said continuous length of conductor; and circuit means for applying an alternating current superimposed on a predetermined direct current bias to produce an alternating magnetic field superimposed on a bias magnetic field and a maximum magnetic field intensity in the thin-film electrodeposited directly on said bare conductor, said thin-film being responsive to said bias magnetic field to produce and control periodic variations in permeability and hysteresis loops for producing symmetrical variations in inductive reactance and steady-state subharmonic oscillations of uniform amplitudes in all of said parametrical oscillatory circuits in response to said alternating magnetic field superimposed on said bias field.

11. A plurality of parametrically operable apparatus interconnected in a logical circuit arrangement for performing logical operations comprising: a plurality of electrical conductors, each conductor comprising a continuous cylindrical conductor formed of stiff, resilient electrically conductive material for providing a stiff, resilient base for minimizing transient deformation and preventing permanent deformation when subjected to bending forces during assembly and use of parametrical units and apparatus; an anisotropic, cylindrical thin-film comprising a nickel-iron alloy of low coercivity electroplated on each of said conductors and firmly adherent thereto, said thin-film on each length of conductor being a circumferentially-continuous thin-film to provide circumferentially-continuous magnetic paths about said conductors; a plurality of tuned circuits for each of said conductors, each of said tuned circuits including an input, output, capacitive element and an electrical winding encircling the thin-film, said windings being disposed at respective spaced-apart portions of each of said conductors and in inductive relation to respective spaced-apart portions of said thin-films; circuit means for applying an A.C. exciting current of a predetermined high frequency and a D.C. bias current to said electrical conductors to produce an alternating magnetic field superimposed on a bias magnetic field having a maximum magnetic field intensity along the entire length of the conductor surfaces of said conductors and in said magnetic thin-films deposited directly on said conductor surfaces, said anisotropic thin-films being responsive to said magnetic fields to cause oscillatory motion of the direction of magnetization by periodic rotation of the magnetization vector to produce periodic, uniform variations in the permeability of said thin-films along the entire length of said conductors; and circuit means for interconnecting predetermined inputs and outputs of said tuned circuits to provide said logical circuit arrangement for performing said logical operations in response to logical signals applied to at least a predetermined one of said inputs.

12. Parametrically operable apparatus comprising in combination: a first electrical conductor; an anisotropic thin film of magnetic material formed directly on at least a circumferential portion of said first electrical conductor to produce a circumferentially-continuous thin film surface thereon, said anisotropic thin film having a preferred direction of remanent magnetization along an easy axis and a non-preferred direction of magnetization along a hard axis normal to said easy axis; circuit means for applying an A.C. energizing signal to said first electrical conductor to produce an alternating magnetic field having a maximum available magnetic field intensity at the periphery of said first electrical conductor and in said thin film formed directly on said conductor, said anisotropic thin film being responsive to said alternating magnetic field to cause oscillatory motion of the direction of magnetization by rotation of the magnetization vector thereof to produce periodic variations in the permeability of said thin film; a second electrical conductor magnetically linking said thin film; and circuit means connected to said second electrical conductor to form a tuned circuit having a natural resonant frequency, said tuned circuit being responsive to said periodic variations in permeability of said thin film and said alternating magnetic field to produce periodic variations of the inductive reactance of said tuned circuit to induce parametrical oscillations therein.

13. The combination according to claim 12 in which said anisotropic thin film of magnetic material comprises a metallic electroplate which is firmly adherent to said first conductor.

14. The combination according to claim 12 in which a plurality of tuned circuits are provided at separate parametrical unit locations along said first conductor to produce inductive coupling of A.C. energizing signals to respective ones of said plurality of tuned circuits to produce parametrical oscillations in each of said plurality of tuned circuits.

15. The combination according to claim 12 in which said first electrical conductor consists of a conductive metal substrate and said thin film is firmly adherent to said substrate.

16. The combination according to claim 15 in which the thickness of said thin film is on the order of about 10,000 angstrom units.

17. The combination according to claim 15 in which the direction of said easy axis is approximately axial along said first conductor and the direction of said hard axis is approximately circumferential.

18. Parametrically operable apparatus comprising in combination: a first electrical conductor; a substantially continuous circumerential thin layer of magnetic material disposed directly on at least a circumferential portion of said first electrical conductor, said thin layer of magnetic material having a preferred direction of remanent magnetization along an easy axis and a non-preferred direction of remanent magnetization along a hard axis normal to said easy axis; circuit means for applying an A.C. energizing signal to said electrical conductor to produce an alternating magnetic field in said thin layer, said thin layer of magnetic material being responsive to said alternating magnetic field to cause oscillatory motion of the direction of magnetization to produce periodic variations in the permeability of said thin layer; a second electrical conductor disposed in a direction transverse to said first electrical conductor and magnetically linking said thin layer of magnetic material; and circuit means connected to said second electrical conductor to form a tuned circuit having a natural resonant frequency, said tuned circuit being responsive to said periodic variations in permeability of said thin layer of magnetic material and said alternating magnetic field to produce periodic variations of the inductive reactance of said tuned circuit to produce parametrical oscillations therein.

19. The combination in accordance with claim 18 in which said magnetic material comprises a thin film.

20. The combination in acordance with claim 19 in which said thin film of magnetic material comprises an electroplate of substantially uniform thickness.

21. The combination in accordance with claim 19 in which the direction of said easy axis is approximately axial along said first electrical conductor.

22. The combination according to claim 19 in which said first electrical conductor comprises a conductive substrate and said thin film of magnetic material is deposited directly on said substrate.

23. The combination in accordance with claim 19 in which said thin film of magnetic material comprises an electroplate of nickel-iron alloy firmly adherent upon said substrate.

24. The combination according to claim 19 in which said first electrical conductor comprises a stiff, resilient bare wire consisting of a substrate of beryllium-copper alloy.

25. Parametrically operable apparatus comprising in combination: a first electrical conductor; an anisotropic thin film electroplate of magnetic material formed directly on said electrical conductor to produce a circumferentially-continuous thin film surface firmly adherent thereto, said anisotropic thin film having a preferred direction of remanent magnetization along an easy axis approximately parallel to the axis of said first electrical conductor and a non-preferred direction of magnetization along a hard axis approximately normal to said easy axis and circumferential about said first electrical conductor; circuit means for applying a direct current bias and an A.C. energizing signal to said first electrical conductor to produce a direct current field and an alternating magnetic field having maximum available magnetic field intensities at the periphery of said electrical conductor and in said thin film formed directly on said conductor, said anisotropic thin film being responsive to said direct current field to change the direction of magnetization from said easy axis and responsive to said alternating magnetic fields to cause oscillatory motion of the direction of magnetization by rotation of the magnetization vector thereof to produce periodic variations in the permeability of said thin-film; a second electrical conductor magnetically linking said thin film; and circuit means connected to said second electrical conductor to form a tuned circuit having a natural resonant frequency, said tuned circuit being responsive to said periodic variations in permeability of said thin film and said alternating magnetic field to produce periodic variations of the inductive reactance of said tuned circuit to produce parametrical oscillations therein.

26. The combination in accordance with claim 25 in which the thickness of said thin film is on the order of about 10,000 angstrom units.

27. The combination in accordance with claim 26 in which said thin film is constituted essentially of a nickel-iron electroplate firmly adherent upon said first electrical conductor.

References Cited

UNITED STATES PATENTS

| | | | |
|---|---|---|---|
| 2,957,087 | 10/1960 | Goto | 307—88 |
| 2,945,217 | 7/1960 | Fisher | 340—174 |
| 3,051,891 | 8/1962 | Jorgensen | 307—88 |

OTHER REFERENCES

IBM Technical Disclosure Bulletin, "Parametron Thin Film Storage," by W. E. Proebster, vol. 2, No. 6, April 1960.

BERNARD KONICK, *Primary Examiner.*

JOHN F. BURNS, R. L. SRAGOW, J. W. MOFFITT, *Examiners.*

L. W. MASSEY, R. R. HUBBARD, H. D. VOLK, *Assistant Examiners.*